United States Patent
Suzuki (10) Patent No.: US 8,304,653 B2
(45) Date of Patent: Nov. 6, 2012

(54) PROTECTOR FOR WIRE HARNESS AND METHOD FOR FIXING PROTECTOR TO WIRE HARNESS

(75) Inventor: Takashi Suzuki, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 402 days.

(21) Appl. No.: 12/682,109

(22) PCT Filed: Feb. 12, 2008

(86) PCT No.: PCT/JP2008/052257
§ 371 (c)(1),
(2), (4) Date: Apr. 8, 2010

(87) PCT Pub. No.: WO2009/047923
PCT Pub. Date: Apr. 16, 2009

(65) Prior Publication Data
US 2010/0218976 A1    Sep. 2, 2010

(30) Foreign Application Priority Data
Oct. 11, 2007    (JP) .................................. 2007-265474

(51) Int. Cl.
*H02G 3/04* (2006.01)
(52) U.S. Cl. ..................... 174/72 A; 174/68.3; 174/68.1; 174/70 C; 248/49; 439/207
(58) Field of Classification Search ................ 174/72 A, 174/72 C, 73.1, 72 TR, 88 R, 70 C, 101, 174/135, 68.1, 68.3, 96, 97, 99 R; 439/207, 439/212, 208; 248/49, 74.1, 68.1; 29/407.01, 29/428, 407.1
See application file for complete search history.

(56) References Cited

U.S. PATENT DOCUMENTS

| | | | | |
|---|---|---|---|---|
| 5,378,166 A * | 1/1995 | Gallagher, Sr. | ............... | 439/214 |
| 5,688,135 A * | 11/1997 | Gallagher, Sr. | ............. | 174/72 A |
| 6,126,123 A * | 10/2000 | Yang | ............................ | 248/74.1 |
| 7,038,133 B2 * | 5/2006 | Arai et al. | .................... | 174/72 A |
| 7,118,410 B2 | 10/2006 | Hatori | | |
| 8,188,368 B2 * | 5/2012 | Suzuki | ........................ | 174/72 A |
| 8,198,533 B2 * | 6/2012 | Terada et al. | ............... | 174/72 A |

FOREIGN PATENT DOCUMENTS

| | | |
|---|---|---|
| JP | 8-205360 | 8/1996 |
| JP | 2003-125511 | 4/2003 |
| JP | 2004-166454 | 6/2004 |
| JP | 2004-229350 | 8/2004 |
| JP | 2005-151701 | 6/2005 |

* cited by examiner

*Primary Examiner* — Angel R Estrada
(74) *Attorney, Agent, or Firm* — Gerald E. Hespos; Michael J. Porco (57) ABSTRACT

A wire harness includes a main line and branch lines. A protector has longitudinal ends with main line inlet and outlet ports and branch line ports between the ends. Branch line connectors are connected to the branch lines drawn out of the branch line ports. A main line connector is connected to the main line drawn out of the main line outlet port. The branch line connectors and the main line connector are connected to test connectors for a continuity test. Lengths of the branch lines and/or the main line are greater than required in the motor vehicle so that the main line and branch line connectors are connected to the test connectors. A wire additional length containing space is provided in the protector and communicates with the branch line ports and/or with the line outlet port for the lines having the additional lengths.

2 Claims, 5 Drawing Sheets

PROTECTOR FOR WIRE HARNESS AND METHOD FOR FIXING PROTECTOR TO WIRE HARNESS

BACKGROUND OF THE INVENTION

1. Field of the Invention

This invention relates to a protector for a wire harness and a method for attaching the protector to the wire harness, and more particularly relates to the protector in which a length of a branch line drawn out of the protector mounted on the wire harness is set to be a length required for a continuity test and an additional length of the branch line can be accommodated in the protector after finishing the continuity test.

2. Description of the Related Art

Heretofore, a wire harness is arranged in a motor vehicle in order to electrically connect various kinds of electrical equipments installed in a vehicle body of the motor vehicle. A protector made of a resin material is often mounted on the wire harness in order to protect the wire harness and to restrain an arranging direction of the wire harness. The wire harness branches branch lines from a main line in accordance with various kinds of connections in design. Some protectors are mounted on a main line with branch lines.

Lengths of the branch lines and main line are set to be slightly greater than lengths required for arranging the wire harness in the motor vehicle in order to couple connectors connected to terminals of the branch lines and main line to mating connectors.

Also, in a process of assembling the wire harness, a continuity test is applied to connectors connected to the terminals of the branch lines and main line. At this time, since connectors for a continuity test are secured to a test table of a continuity test apparatus, the wire harness side connectors are drawn and coupled to the test connectors. Since the test connectors are secured to the test table and are spaced apart from one another at given distances, it is necessary to couple the wire harness side connectors to the juxtaposed test connectors at the predetermined positions.

However, there are some cases where the lengths of the main line and branch line connected to the wire harness side connectors are too short to be drawn out to the test connectors. That is, the distances required for a continuity test between the test connectors and the wire harness side connectors are longer than the distances required for arranging the wire harness in the motor vehicle. These differences between the distances become excess lengths upon arranging the wire harness in the motor vehicle.

As described above, the lengths of the branch lines and main line are set to be slightly longer than those required for arranging them in the motor vehicle. If the branch lines and main line are further elongated for the continuity test, additional lengths upon arrangement of the wire harness will be further elongated. Such additional lengths will cause some problems in which the arranged wire harness may interfere with external members in the motor vehicle and may rattle and generate unusual noises on account of vibrations of the vehicle body.

Heretofore, a structure for absorbing wire additional lengths of a wire harness in a protector has been disclosed in JP 2005-151701 A.

Figure 5A:
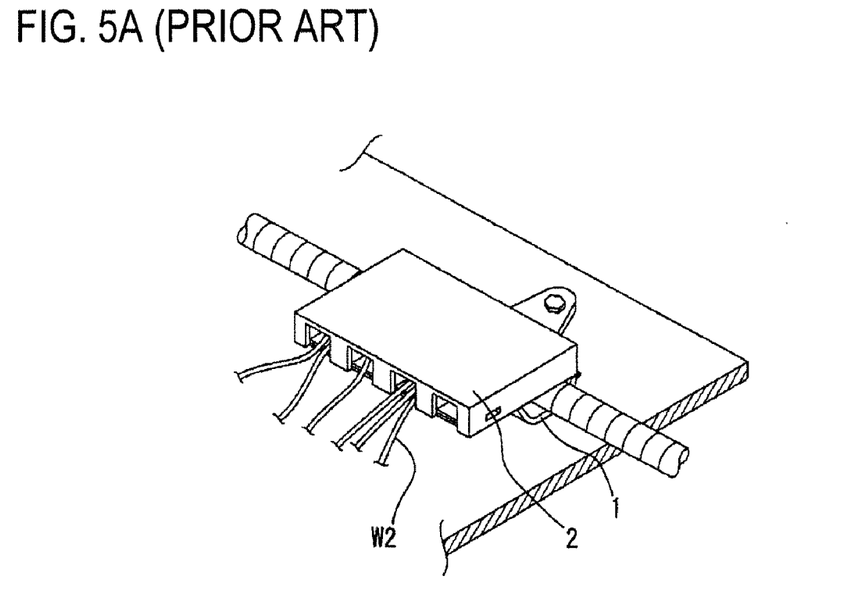
FIG. 5A is a perspective view of a conventional protector for a wire harness.
Figure 5B:
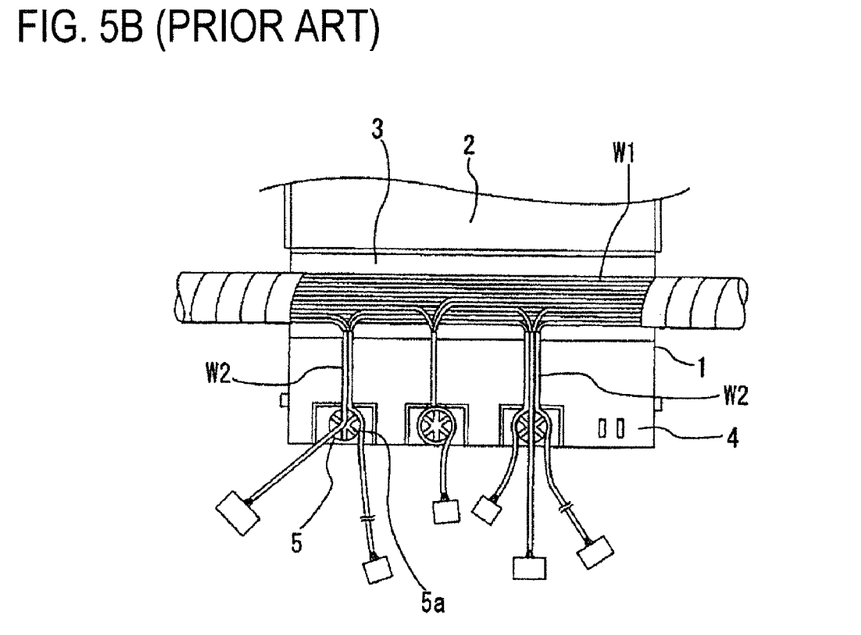
FIG. 5B is a plan view of the conventional protector, illustrating an arrangement of a main line and branch lines of the wire harness in the protector.

As shown in FIGS. 5A and 5B, the protector includes a protector main body 1 that contains a main line W1 of a wire harness and branch lines W2 of the wire harness, and a lid 2. The protector main body 1 is provided with a main line threading portion 3 and a flat plate-like branch line drawing portion 4 that protrudes in a direction perpendicular to the threading direction of the main line W1. The branch line drawing portion 4 is provided on a distal end with direction restraining members 5. Each direction restraining member 5 is formed into a circular plate-like configuration and is provided with branch line threading grooves 5a that extend radially from a center of the member 5. When the branch line W2 is pushed into the branch line threading groove 5a, the direction of branch line W2 is restrained by the direction restraining member 5 at the distal end of the branch line drawing portion 4 and the length of the branch line W2 is adjusted.

However, since the protector disclosed in JP 2005-151701 A is provided on the distal end of the branch line drawing portion 4 with the direction restraining members 5, the branch lines W2 may be loosened between branch line branching positions of the branch line drawing portion 4 and the direction restraining members 5, and the branch lines W2 may interfere with the lid 2 or the branch line drawing portion 4, thereby causing the branch lines W2 to be broken. Also, since the branch line W2 extend in the direction perpendicular to the main line threading direction and the lengths of the branch lines W2 are adjusted by the direction restraining members 5 at the distal end of the branch line drawing portion 4, the whole of the protector are elongated in the perpendicular direction, thereby requiring an additional space for arrangement.

Further, in the case of a continuity test, the protector disclosed in JP 2005-151701 A cannot adjust the lengths of the branch lines extensively. Consequently, the above protector is not suitable for adjusting the additional lengths for the continuity test. If the length at the branch line terminal is set to be the length for the continuity test, the protector cannot contain the additional lengths upon arrangement of the wire harness, and the branch lines may interfere with external interfering members, thereby breaking the branch lines.

SUMMARY OF THE INVENTION

In view of the above problems, an object of the present invention is to contain additional lengths required for a continuity test in a protector upon arrangement of a wire harness and to prevent branch lines and/or a main line from interfering with external interfering members.

In order to solve the above problems, the present invention is directed to a protector for a wire harness. The wire harness is arranged in a motor vehicle. The protector is mounted on a given area on the wire harness and is made of a resin product. The wire harness to be threaded in the protector includes a main line having one to three pieces, a plurality of branch lines branched from the main line, and a splice portion between the main line and the branch line. A main line terminal and branch line terminals are connected to connectors. The connectors are adapted to be coupled to a plurality of test connectors for a continuity test juxtaposed on a continuity test table. A length of the main line is set to be greater than a required length upon arranging the wire harness in the motor vehicle by an additional length so that the main line connector is coupled to the test connector. The protector is provided on longitudinal opposite ends with a main line inlet port and a main line outlet port and between the inlet and outlet ports with a main line threading portion having a small volume with a narrow width and a small cross section. The protector is provided on a longitudinal intermediate part with a plurality of branch line drawing ports spaced apart from one another, on the main line threading portion with a splice containing space having a large volume in part, on the longitudinal intermediate part with a guide portion that bends the branch line branched from the splice portion and guides the bent branch line to the branch line drawing port, on the longitudinal intermediate part with a partition that defines the guide portion and the splice containing portion, on an interior side communicated to the branch line drawing port with a wire additional length containing space, and on peripheral edges of the branch line drawing ports and the main line outlet port with tape-wrapping tongue pieces.

According to the protector for the wire harness of the present invention constructed above, even if the length of the wire harness required for the continuity test is longer than the length required for arranging the wire harness in the motor vehicle and this results in an additional length, it is possible to accommodate the additional length in the wire additional length containing space upon arrangement of the wire harness in the motor vehicle, to prevent the wire harness from interfering with the external members and from being broken by the members, and to prevent the main line and/or the branch lines from rattling on account of vibrations of the vehicle body, thereby suppressing unusual noises caused by the rattling.

Also, it is possible to accommodate the additional lengths of the main line and the branch lines in the protector after finishing the continuity test and to distribute the wire harness to a maker with the wire harness being set to be the required lengths between the drawing port and the connectors. Further, since the lengths for arrangement can be adjusted, it is possible to obtain a length for arrangement in compliance with a type of a motor vehicle.

The additional length is set to be, for example, 15 to 20 mm (millimeters). It is preferable that a length between the main line outlet port or the branch line drawing port and the connector is set to be +2 mm more than the length required for arrangement.

In the protector of the present invention, the main line includes one to three pieces. A splice portion between the main line and the branch lines is accommodated in a splice containing portion having a large volume in part. The protector is provided with a guide portion that bends a branch line branched from the splice portion to guide the branch line into the branch line drawing port. A partition is provided between the guide portion and the splice containing portion.

The main line threading portion of the protector becomes narrow in the case where the main line is a few pieces. However, since the splice containing space requires a great volume, areas for defining the splice containing space are limited in the protector. Consequently, the branch line branched from the splice portion is inserted into the guide portion and is bent from the splice portion to the branch line drawing port. Since the partition divides the protector into the splice containing space and the guide portion, it is possible to prevent the protector from enlarging and to hold and position the splice portion.

Also, if the guide portion that branches the branch line from the splice portion and guides the branched line to the branch line drawing port is utilized as an additional length absorbing space upon the continuity test, it is not necessary to enlarge the protector in order to absorb the additional length.

A method for attaching the protector to the wire harness, comprising the steps of: threading the main line with the branch lines in the protector and drawing the branch lines from the branch line drawing ports; disposing the protector at a side of a community test apparatus; coupling the branch line connectors for the branch line terminals drawn out of the branch line drawing ports and the main line connector for the main line terminal to the test connectors disposed on a test table of the continuity test apparatus and spaced apart from one another at given distances and carrying out a continuity test; after finishing continuity test, accommodating the additional length in the wire additional length containing space so that the length of the main line terminal drawn out of the main line outlet port is accorded with predetermined length required for arranging the lines in the motor vehicle; and after setting the lengths to be the predetermined length, wrapping a tape around the tape-wrapping tongue pieces projecting from the peripheral edges of the branch line drawing ports and the main line outlet port.

According to the above process, it is possible to obtain a sufficient length from the branch line drawing ports or the main line outlet port to the continuity test connectors upon the continuity test. Since the additional length can be contained in the protector when arranging the wire harness in the motor vehicle, it is possible to prevent the additional length from being loosened upon arrangement and from interfering with the external members and from being broken. It is also possible to prevent the main line and the branch lines from rattling due to vibrations of the vehicle body and from generating unusual noises due to the rattling.

As described above, according to the protector for the wire harness of the present invention, even if the length of the wire harness required for the continuity test is longer than the length required for arranging the wire harness in the motor vehicle and this results in an additional length, it is possible to accommodate the additional length in the wire additional length containing space upon arrangement of the wire harness in the motor vehicle after finishing the continuity test, to prevent the wire harness from interfering with the external members and from being broken by the members, with the wire harness being arranged in the motor vehicle, and to prevent the main line and/or the branch lines from rattling on account of vibrations of the vehicle body, thereby suppressing unusual noises caused by the rattling.

Also, in the case where the splice portion between the main line and branch lines of the wire harness is contained in the protector, since the guide portion branches the branch line from splice portion and guides the branch line to the branch line drawing port, it is possible to efficiently arrange the branch line and to downsize the protector, although the splice portion with a great volume is provided in the protector. Since the splice portion is contained in the protector, it is possible to protector the splice portion itself.

Further, if the guide portion that branches the branch line from the splice portion and guides the branched line to the branch line drawing port is utilized as an additional length absorbing space upon the continuity test, it is possible to provide the wire additional length containing space in the protector without enlarging the protector.

According to the method for attaching the protector of the present invention to the wire harness, it is possible to obtain sufficient lengths of the branch lines and main line between the branch line drawing ports or the main line outlet port and the continuity test connectors upon the continuity test, thereby enhancing workability in the continuity test.

After finishing the continuity test, merely by accommodating the additional lengths in the protector and by tape-wrapping the branch lines and/or the main line, it is possible to set them to be the required lengths upon arrangement of the wire harness.

DETAILED DESCRIPTION OF THE PREFERRED EMBODIMENTS

Embodiments of a protector for a wire harness and a method for attaching the protector to the wire harness in accordance with the present invention will be described below by referring to the drawings.

FIGS. 1 to 4 show an embodiment of a protector 10 for a wire harness (hereinafter referred to as a "protector") in accordance with the present invention.

Figure 1A:
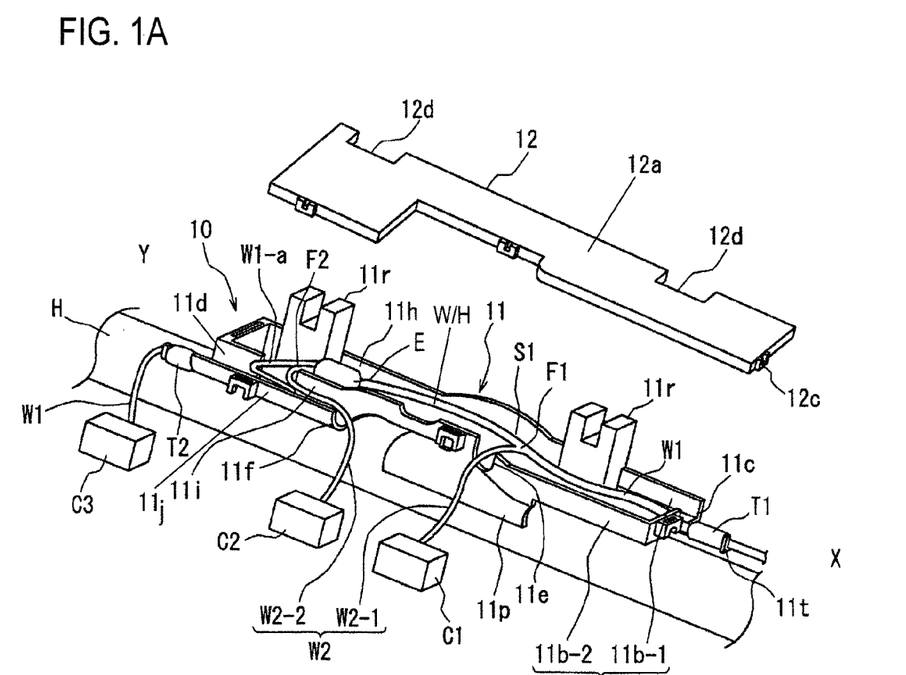
FIG. 1A is a perspective view of a protector for a wire harness in accordance with the present invention, illustrating the protector installed in a motor vehicle.
Figure 1B:
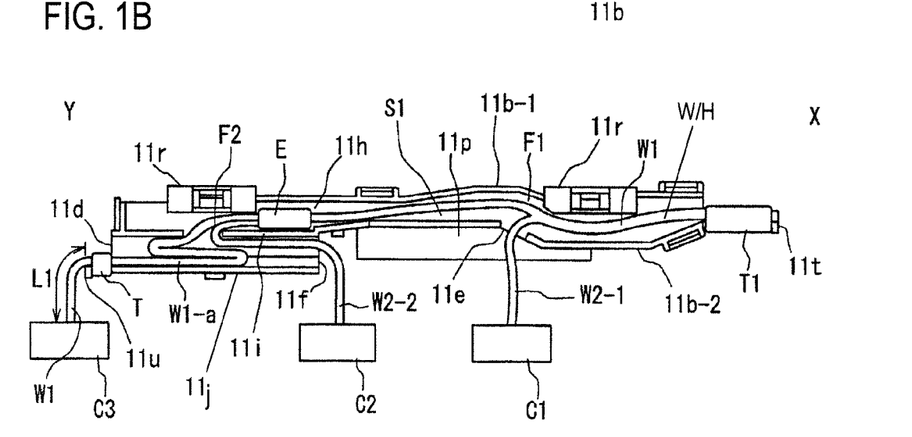
FIG. 1B is a plan view of the protector shown in FIG. 1A, illustrating a main line and branch lines of a wire harness arranged in the motor vehicle.

The protector 10 is attached to a wire harness W/H at a branching area including two positions of branch lines W2 (W2-1, W2-2) branched from two or three main lines W1. The protector 10 includes a protector main body 11 for containing the main lines W1 and branch lines W2, and a lid 12 for closing an upper opening of the protector main body 11. The protector 10 and lid 12 are made of resin productions.

In the present embodiment, the main lines W1 and branch lines W2 contained in the protector 10 are used as signal lines for a fuel injection unit.

As shown in FIG. 1A through FIG. 2B, the protector main body 11 includes a bottom wall 11a and side walls 11b (11b-1, 11b-2) that project from opposite side end edges of the bottom wall 11a. The protector main body 11 is formed into a trough-like configuration.

The protector main body 11 is provided on longitudinal one end with main line inlet port 11c and on the longitudinal other end with outlet port 11d, and on an intermediate part with two branch line drawing ports 11e and 11f. The branch line drawing port at the main line inlet side X (FIG. 2A) defines a first branch line drawing port 11e while the branch line drawing port at the main line outlet side Y (FIG. 2A) defines a second branch line drawing port 11f. A space surrounded by the bottom wall 11a and the side walls 11b defines a wire harness containing space S1. The protector main body 11 has a small volume with a relatively narrow width and a small cross section area so that the protector main body 11 threads relatively small diameter wires that constitute two or three signal lines.

Figure 2A:
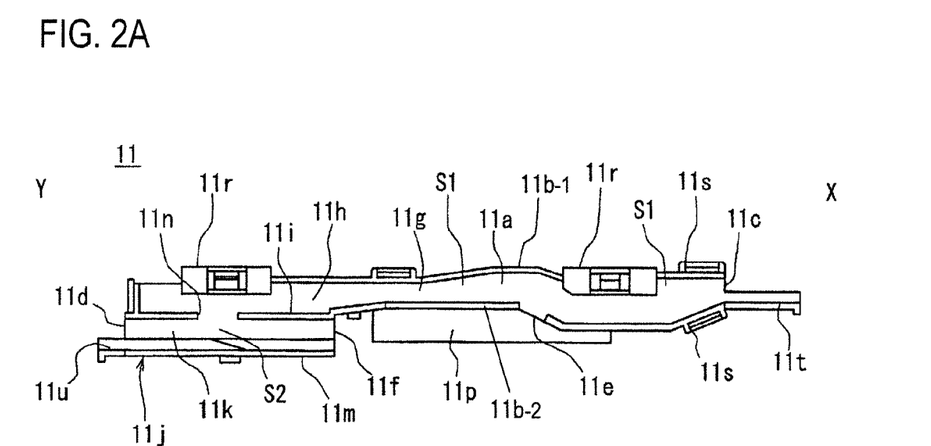
FIG. 2A is a plan view of a protector main body.

Particularly, since an external interfering member (not shown) is disposed outside the side walls at a longitudinal central part of the protector main body 11, the central part thereof is formed into a narrow portion 11g.

A wide portion is continued from the narrow portion 11g to the main line outlet port side Y. The wide portion defines a splice containing portion 11h. The splice containing portion 11h has a great volume in order to contain a splice portion E.

A guide portion 11j is provided at a side of the splice containing portion 11h through the side wall 11b-2 so as to guide the branch line W2 to the second branch line drawing port 11f.

Figure 2B:
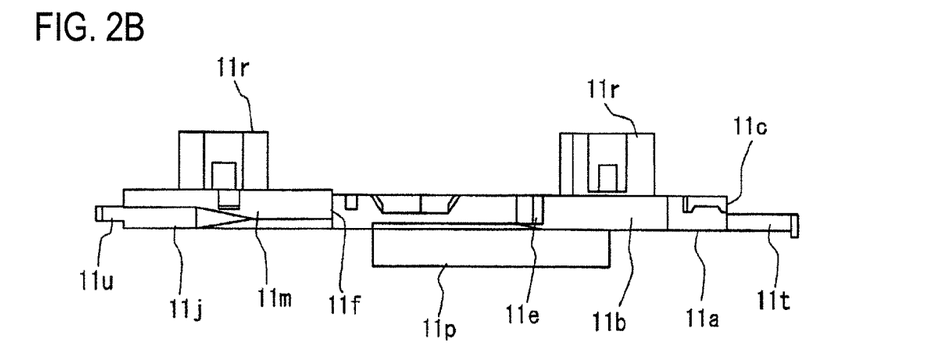
FIG. 2B is a front elevation view of the protector main body shown in FIG. 2A.

The guide portion 11j includes a bottom wall 11k that projects outward from a lower end of the side wall 11b-2, and a side wall 11m that projects upward from a side end edge of the bottom wall 11k. The guide portion 11j has an L-shaped cross section. An opening at the main line inlet port side X defines the second branch line drawing port 11f while an opening at the opposite from the second branch line drawing port 11f defines the main line outlet port 11d. A space defined by the guide portion 11j constitutes a wire additional length containing space S2.

A cutout 11n is provided in the side wall 11b-2 provided with the guide portion 11j to communicate the wire additional length containing space S2 with a wire harness containing space S1. The side wall 11b at the main line inlet port side X of the cutout 11n defines a partition 11i that serves to partition the guide portion 11j from the splice containing portion 11h.

The protector main body 11 is provided on a central part with a pipe guide portion 11p that has an arcuate cross section and projects downward from a lower end of the side wall 11b-2. The pipe guide portion 11p protects a pipe H disposed in a threading direction of the wire harness from fuel splash.

Also, a vehicle body securing portion 11r projects from the side wall 11b-1 opposed to the side wall 11b-2 provided with the guide portion 11j. The vehicle body securing portion 11r is inserted into and locked on a locking portion (not shown) protruding from a vehicle body so as to secure the protector 10 to the vehicle body.

The side wall 11b-1 is provided with frame portions 11s (FIG. 2A) that are spaced at a given distance and engage pawls 12c of the lid 12. When the pawls 12c of the lid 12 are engaged with the frame portions 11s, the lid 12 is secured to the protector main body 11.

Tape-wrapping tongue pieces 11t and 11u project from peripheral edges of the main line inlet and outlet ports 11c and 11d at the opposite ends of the protector main body 11. When main line W1 is threaded into the protector main body 11, tapes T1 and T2 are wound around the tape-wrapping tongue pieces 11t and 11u and the main line W1 to secure the main line W1 to the tape-wrapping tongue pieces 11t and 11u.

Figure 3A:
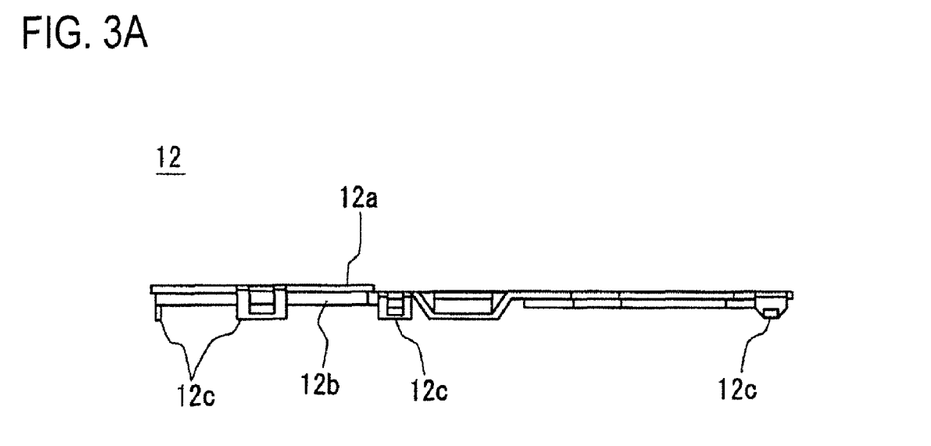
FIG. 3A is a front elevation view of a lid.
Figure 3B:
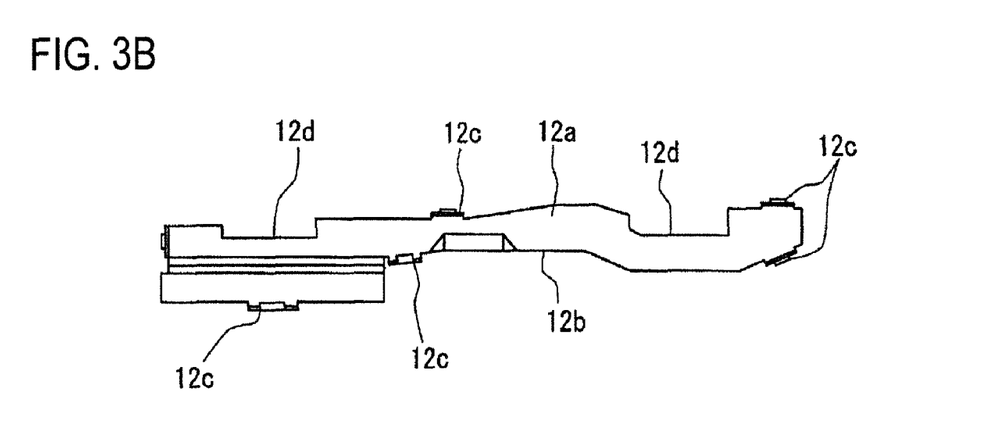
FIG. 3B is a plan view of the lid shown in FIG. 3A.

As shown in FIGS. 1A and FIGS. 3A, 3B, the lid 12 includes an upper wall 12a and a side wall 12b that projects from a peripheral edge of the upper wall 12a. The side wall 12b is provided with pawls 12c at positions corresponding to the frame portions 11s of the protector main body 11. Also, the side wall 12b is provided with recesses 12d at positions corresponding to the vehicle body securing portions 11r of the protector main body 11. In order to lock the lid 12 onto the protector main body 11, the vehicle body securing portions 11r are fitted into the recesses 12d to secure the lid to the protector main body 11.

A wire harness W/H, to which the protector 10 is attached, branches two branch lines W2-1 and W2-2 from the main line W1 at a first branch position F1 and a second branch position F2. The branch line W2-2 is spliced to the main line W1. A splicing portion E is disposed between the first branch position F1 and the second branch position F2.

Connectors C1 and C2 are connected to terminals of the branch lines W2-1 and W2-2 while a connector C3 is connected to a terminal of the main line W1.

Since the main line W1 is required for a given length at the terminal side upon a continuity test describe after, the main line W1 has an additional length W1-a that is greater than a length required for arrangement in the motor vehicle.

On the other hand, the branch lines W2-1, W2-2 are not provided with additional lengths required for the continuity test, since the lengths required for arrangement in the motor vehicle are greater than the lengths required for the continuity test.

The main line W1 of the wire harness W/H is inserted into a space between the both side walls 11b-1 and 11b-2 of the protector main body 11, the branch line W2-1 is drawn out of the first branch line drawing port 11e, and the splice portion E is accommodated in the splice containing portion 11h. The branch line W2-2 spliced to the main line W1 is branched and bent at the second branch position F2. The bent branch line W2-2 is inserted into the guide portion 11j and is drawn out of the second branch line drawing port 11f.

Also, a terminal of the main line W1 is drawn out of the main line outlet port 11d.

Thus, after the wire harness W/H is arranged in the protector main body 11, the lid 12 is mounted on and secured to the protector main body 11.

After the protector 10 is attached to the wire harness W/H, the continuity test for the connectors C1 to C3 connected to the branch line terminals and main line terminal of the wire harness W/H is carried out. After completing the continuity test, the main line W1 and branch lines W2-1 and W2-2 are secured to the protector 10 by a tape-wrapping manner. Before effecting the continuity test, the tape-wrapping manner is not applied to the lines W1, W2-1, W2-2.

Next, a method for testing continuity of the wire harness W/H, to which the protector is attached, will be described below.

Figure 4:
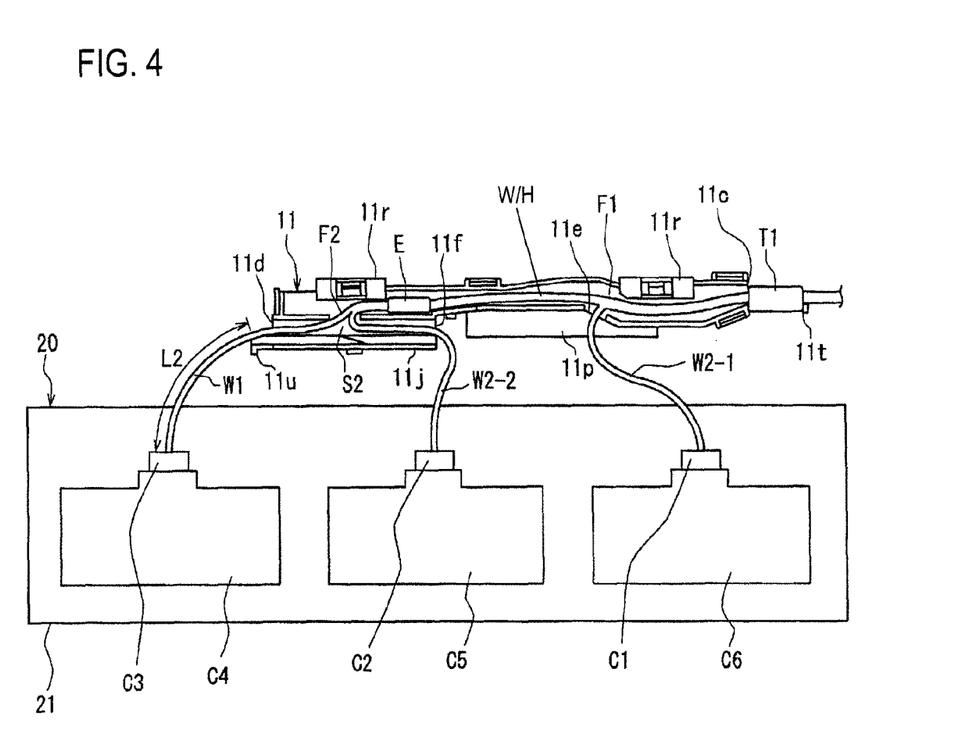
FIG. 4 is a plan view of the protector similar to FIG. 1B, illustrating an arrangement of the main line and branch lines during a continuity test.

As shown in FIG. 4, a continuity test apparatus 20 includes a base table 21, and three connectors C4 to C6 for a continuity test that are disposed on an upper surface of the base table 21 and are spaced from one another by a given distance.

The wire harness W/H is disposed near the continuity test apparatus 20.

As shown in FIG. 4, during the continuity test, the connectors C1 and C2 connected to the terminals of the branch lines W2-1 and W2-2 drawn out of the branch line drawing ports 11e and 11f and the connector C3 connected to the terminal of the main line W1 drawn out of the main line outlet port 11d are positioned on the base table 21 of the continuity test apparatus 20 and are fitted into the connectors C6 to C4 for a continuity test.

At this time, the main line W1 is inserted into the wire additional length containing space S2 without bending the wire additional length, is drawn out of the main line outlet port 11d, and is fitted into the connector C3. Under this condition, a length of the main line W1 between the main line outlet port 11d and the connector C3 becomes a length L2.

After the connector C3 of the main line terminal is coupled to the connector C4 for the continuity test and the continuity test is finished, as shown in FIG. 1B, the main line W1 that branches the branch line W2-2 at the second branch position F2 bends and contains the additional length W1-a in the wire additional length containing space S2 to absorb the excess length.

Under this condition, the terminal of the main line W1 is secured to the tape-wrapping tongue piece 11u by the tape-wrapping manner. Accordingly, a length of the terminal of the main line drawn out of the main line outlet port 11d becomes a predetermined length L1 (FIG. 1B) required for arrangement of the wire harness W/H in the motor vehicle.

Since the branch lines W2-1 and W2-2 are not provided with the additional lengths for the continuity test, it is not necessary to absorb the additional lengths in the protector after finishing the continuity test and the branch lines W2-1 and W2-2 are drawn out of the branch line drawing ports 11e and 11f and are secured to the protector 10 by the tape-wrapping manner.

As described above, since the terminal of the main line W1 is provided with the additional length required for the continuity test in the protector 10 of the present invention and the additional length can be accommodated in the wire additional length containing space S2 in the protector main body 11 after finishing the continuity test, it is possible to prevent the additional length from interfering with the external interfering member and from being broken by the member, and to prevent unusual noises from being generated on account of rattling of the protector due to vibrations of the vehicle body.

Since the branch line W2-2 is branched from the main line W1 at the splice portion E and the guide portion 11j for guiding the branch line W2-2 to the branch line drawing port 11f is provided on the protector main body 11, it is possible to efficiently arrange the branch lines on the protector main body 11, and it is possible to downsize the protector, although the splice portion E requiring a great volume is provided on the protector main body 11.

Further, since the space defined by the guide portion 11j is utilized as the wire additional length containing space S2, it is possible to restrain the protector from being upsized in order to absorb the additional length, it is possible to restrain an additional cost, and it is possible to readily transfer the wire harness provided with the protector.

Although the additional length is provided on the terminal of the main line in the above embodiment, additional lengths may be provided on the branch lines and wire additional length containing spaces may be provided in an interior of the protector communicated to the branch line drawing ports.

The invention claimed is:

1. A protector for a wire harness wherein said wire harness is arranged in a motor vehicle, and said protector is mounted on a given area on said wire harness and is made of a resin product;
   said wire harness to be threaded in said protector including a main line having one to three pieces, a plurality of branch lines branched from said main line, and a splice portion between said main line and said branch line, a main line terminal and branch line terminals being connected to connectors, said connectors being adapted to be coupled to a plurality of test connectors for a continuity test juxtaposed on a continuity test table, a length of said main line being set to be greater than a required length upon arranging said wire harness in said motor vehicle by an additional length so that said main line connector is coupled to said test connector;
   said protector being provided on longitudinal opposite ends with a main line inlet port and a main line outlet port and between said inlet and outlet ports with a main line threading portion having a small volume with a narrow width and a small cross section;
   said protector being provided on a longitudinal intermediate part with a plurality of branch line drawing ports spaced apart from one another, on said main line threading portion with a splice containing space having a large volume in part, on said longitudinal intermediate part with a guide portion that bends said branch line branched from said splice portion and guides said bent branch line to said branch line drawing port, on said longitudinal intermediate part with a partition that defines said guide portion and said splice containing portion, on an interior side communicated to said branch line drawing port with a wire additional length containing space, and on peripheral edges of said branch line drawing ports and said main line outlet port with tape-wrapping tongue pieces.

2. A method for attaching a protector according to claim 1 to a wire harness, comprising the steps of:
threading said main line with said branch lines in said protector and drawing said branch lines from said branch line drawing ports;
disposing said protector at a side of a community test apparatus;
coupling said branch line connectors for said branch line terminals drawn out of said branch line drawing ports and said main line connector for said main line terminal to said test connectors disposed on a test table of said continuity test apparatus and spaced apart from one another at given distances and carrying out a continuity test;
after finishing continuity test, accommodating said additional length in said wire additional length containing space so that said length of said main line terminal drawn out of said main line outlet port is accorded with predetermined length required for arranging said lines in said motor vehicle; and
after setting said length to be said predetermined length, wrapping a tape around said tape-wrapping tongue pieces projecting from said peripheral edges of said branch line drawing ports and said main line outlet port.

* * * * *